United States Patent
Henin et al.

(10) Patent No.: US 8,782,844 B2
(45) Date of Patent: *Jul. 22, 2014

(54) WINDSCREEN WIPER DEVICE

(75) Inventors: Pierre Henin, Bellefontaine (BE); Patrice Jandion, Aubange (BE); Eric Coos, Aubange (BE)

(73) Assignee: Federal Mogul S.A., Aubange (BE)

( * ) Notice: Subject to any disclaimer, the term of this patent is extended or adjusted under 35 U.S.C. 154(b) by 2505 days.

This patent is subject to a terminal disclaimer.

(21) Appl. No.: 10/562,193

(22) PCT Filed: Jun. 17, 2004

(86) PCT No.: PCT/EP2004/051152
§ 371 (c)(1),
(2), (4) Date: May 22, 2008

(87) PCT Pub. No.: WO2005/000646
PCT Pub. Date: Jan. 6, 2005

(65) Prior Publication Data
US 2008/0222833 A1  Sep. 18, 2008

(30) Foreign Application Priority Data
Jun. 26, 2003 (EP) ..................................... 03101908

(51) Int. Cl.
*B60S 1/38* (2006.01)
*B60S 1/40* (2006.01)

(52) U.S. Cl.
USPC ................................ 15/250.201; 15/250.361

(58) Field of Classification Search
USPC .................................................... 15/43, 452
See application file for complete search history.

(56) References Cited

U.S. PATENT DOCUMENTS

| 5,493,750 | A  | * | 2/1996  | Bollen et al. | 15/250.452 |
| 6,523,218 | B1 |   | 2/2003  | Kotlarski |  |
| 6,668,419 | B1 | * | 12/2003 | Kotlarski | 15/250.43 |
| 8,196,252 | B2 | * | 6/2012  | Henin | 15/250.201 |
| 2009/0013492 | A1 | * | 1/2009  | Henin | 15/250.452 |

FOREIGN PATENT DOCUMENTS

| DE | 19802451 |  | 7/1999 |  |  |
| DE | 19951363 |  | 5/2001 |  |  |
| DE | 19961373 |  | 7/2001 |  |  |
| EP | 1491416 | A1 * | 12/2004 | ............... | B60S 1/38 |
| EP | 1568559 | A1 * | 8/2005  | ............... | B60S 1/40 |

* cited by examiner

*Primary Examiner* — Monica Carter
*Assistant Examiner* — Stephanie Berry
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating wiper arm, with the special feature that at least one connecting piece comprises engaging members engaging around the longitudinal strips so that said strips are mounted in grooves formed by said engaging members, wherein said strips and said connecting piece are slidably connected by means of a snap connection.

8 Claims, 3 Drawing Sheets

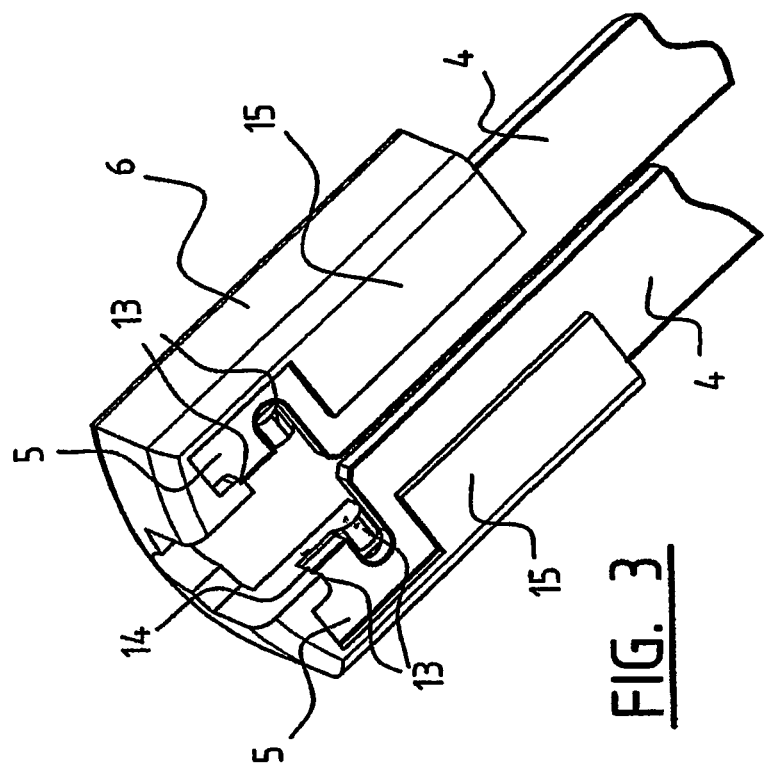
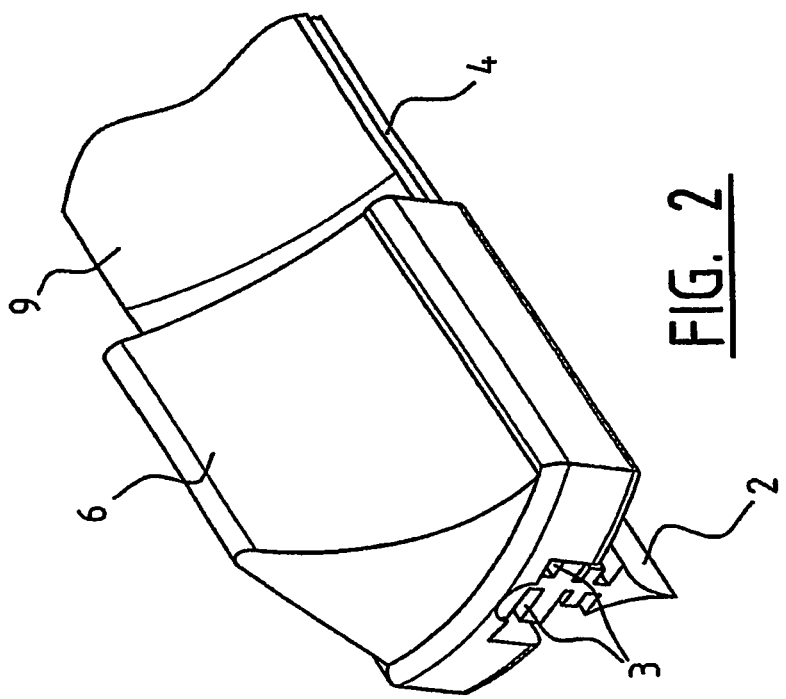

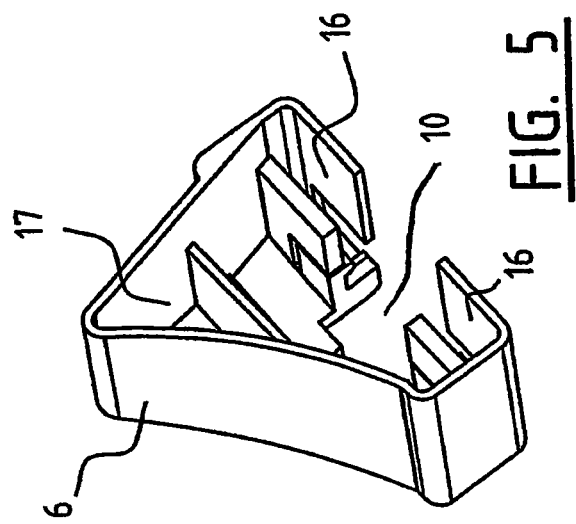
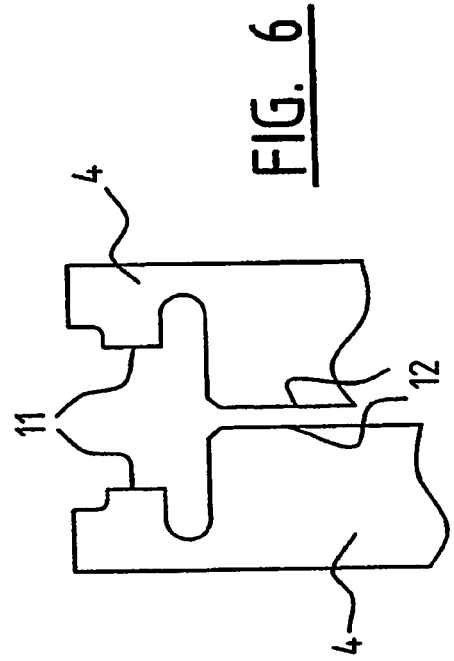
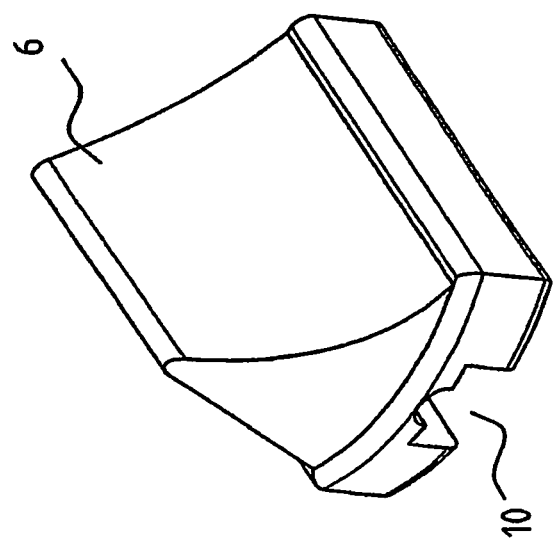

WINDSCREEN WIPER DEVICE

CROSS-REFERENCES TO RELATED APPLICATIONS

This patent application claims priority to International Application No. PCT/EP2004/051152 having an international filing date of Jun. 17, 2004 which claims priority to EP03101908.6 filed on Jun. 26, 2004, all of which are incorporated herein by reference in their entirety.

1. TECHNICAL FIELD

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm.

2. RELATED ART

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The oscillating arm of the prior art windscreen wiper device comprises a projecting pin on one side thereof, which is inserted sideways into a through hole of the connecting device.

One drawback of the prior art windscreen wiper device is the fact that the neighbouring ends of the longitudinal strips and the connecting pieces (in practice also called "end caps") are not connected in a durable, solid manner. Particularly, as the reliability of said connection diminishes with the passage of time, the connecting pieces may come loose from said strips. As a result of said poor connection, the life span of the prior art windscreen wiper device is seriously shortened.

SUMMARY OF THE INVENTION

The object of the invention is to overcome the drawbacks of the prior art as indicated above, in particular to provide a windscreen wiper device wherein the longitudinal strips and the connecting pieces ("end caps") are interconnected in a durable, solid manner.

In order to accomplish that objective, a windscreen wiper device of the kind referred to in the introduction is characterized in that at least one connecting piece comprises engaging members engaging around the longitudinal strips so that said strips are mounted in grooves formed by said engaging members, wherein said strips and said connecting piece are slidably connected by means of a snap connection. By sliding said connecting piece over the neighbouring ends of said strips—or vice versa, that is by sliding the neighbouring ends of said strips into said connecting piece—a reliable snap connection between these parts is realized. The snap connection particularly comprises a hole or an aperture and a protrusion cooperating together.

In one preferred embodiment of a windscreen wiper device in accordance with the invention, the snap connection comprises laterally extending means on said strips. Preferably, said laterally extending means comprise at least one protrusion extending laterally from a longitudinal edge of each strip, said protrusion being located between stops on the connecting piece. In another preferred version, said laterally extending means comprise at least two stops extending laterally from a longitudinal edge of each strip, said stops being located on opposite sides of a protrusion on the connecting piece.

In another preferred embodiment of a windscreen wiper device according to the invention, said laterally extending means extend laterally from the interior longitudinal edge of each strip. In the alternative, said laterally extending means extend laterally from the exterior longitudinal edge of each strip.

In another preferred embodiment of a windscreen wiper device in accordance with the invention, the engaging members are integral with said connecting piece. The connecting piece is particularly made in one piece of plastic.

In another preferred embodiment of a windscreen wiper device according to the invention, said connecting piece is provided with an opening at its free end so that the wiper blade can freely slide through said connecting piece. In other words, the connecting pieces ("end caps") do not retain the wiper blade, so that said connecting pieces allow a relative movement of the wiper blade along the longitudinal strips in the connecting pieces, thus improving the wiping properties of the present windscreen wiper device.

In another preferred embodiment of a windscreen wiper device in accordance with the invention, a spoiler is provided and wherein an end of said spoiler is mounted in said connecting piece. The spoiler is preferably a separate constructional element being entirely detachably connected to the wiper blade, wherein the connecting piece can be slided over said spoiler end.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein a connecting device is provided for an oscillating wiper arm, characterized in that said strips and at least one connecting piece are slidably connected by means of a snap connection, wherein engaging members of said connecting piece engage around the longitudinal strips so that said strips are mounted in grooves formed by said engaging members.

BRIEF DESCRIPTION OF THE DRAWINGS

The invention will now be explained in more detail with reference to figures illustrated in a drawing, wherein:

FIGS. 2 through 6 show details of the windscreen wiper device of FIG. 1.

FIG. 1 shows a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6. The windscreen wiper device 1 is further equipped with a connecting device 7 for an oscillating arm 8, and a spoiler 9.

FIG. 2 shows a free end of the windscreen wiper device 1 of FIG. 1, whereas FIG. 3 reveals a bottom view of said free end without the wiper blade 2 being present. Corresponding parts have been designated with the same reference numerals. As can be seen from FIGS. 2, 4 and 5 (the latter two figures showing in perspective the connecting piece 6 as a separate constructional element), the connecting piece 6 is provided with an opening 10 in order to allow a relative movement of the wiper blade 2 along the strips 4 inside the connecting piece 6, so that said connecting piece 6 does not block the wiper blade 2 during use. The connecting pieces 6 are made of one piece of plastic.

With reference to FIG. 6 relating to a top view of the strips 4 as such, said strips 4 are each provided with a protrusion 11 extending laterally from a longitudinal interior edge 12 of the strips 4. When a connecting piece 6 is slidably mounted onto the neighbouring ends 5 of the strips 4, a snap or clicking connection is realized, wherein the protrusions 11 are snapped or clicked between stops 13 ("notches 13") inside the connecting piece 6. Each protrusion 11 rests in a small groove 14 between these opposing stops 13. Accordingly, the strips 4 are blocked against any movement in longitudinal direction with respect to the connecting pieces 6. Each connecting piece 6 is also provided with two engaging members 15 made integral therewith, wherein said engaging members 15 engage around the strips 4 so as to form a groove 16 for sliding the strips 4 therein. Said engaging members 15 ensure that the strips 4 are blocked against any movement in transversal direction with respect to the connecting pieces 6. Each connecting piece 6 has a cavity 17 to accommodate the free end of the spoiler 9.

Figure 1:
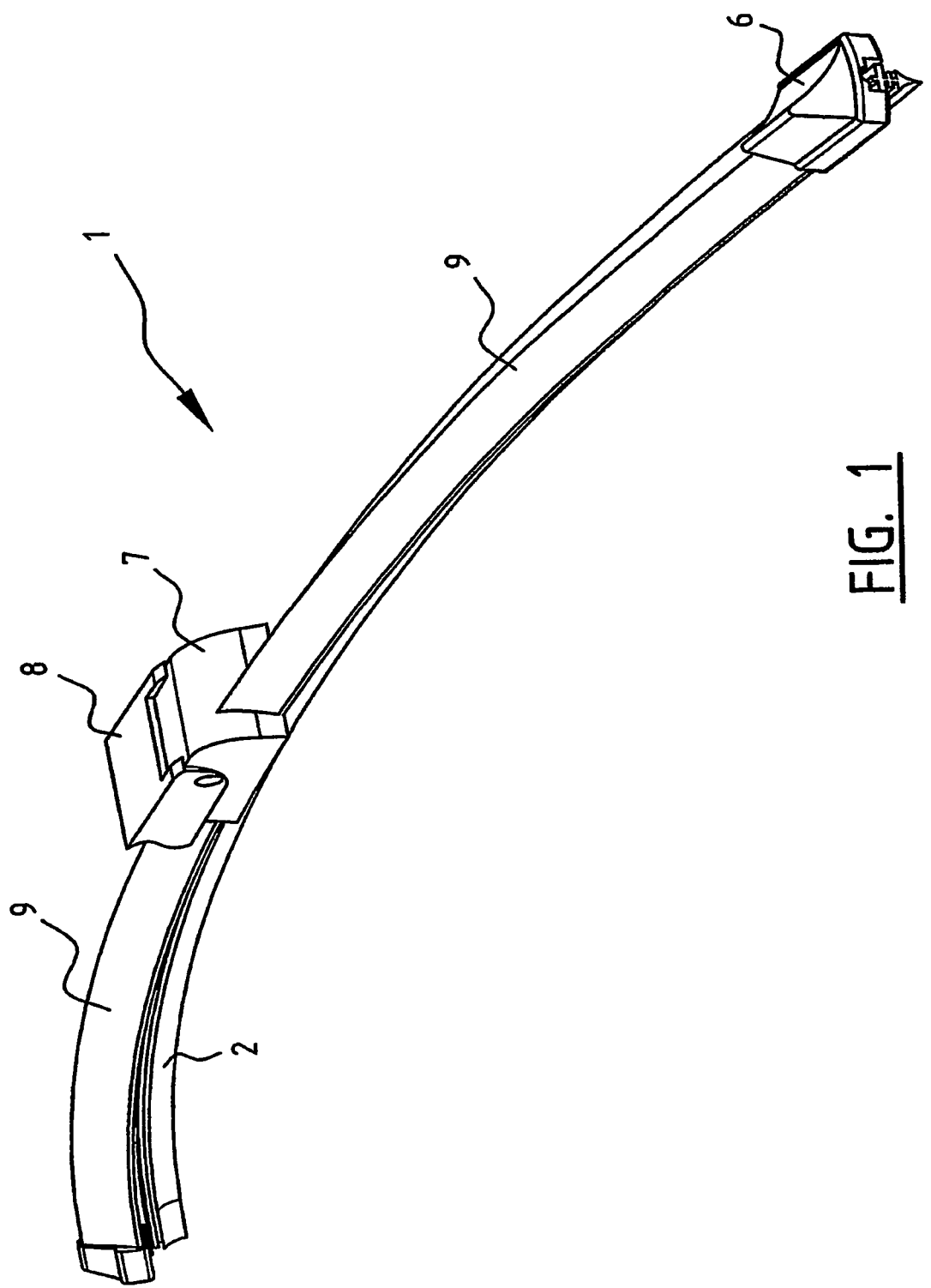
FIG. 1 is a perspective, schematic view of a preferred embodiment of a windscreen wiper device according to the invention.

The stop 13 facing away from the free end of the connecting piece 6 is equipped with an inclined upper surface, so that sliding said connecting piece 6 onto the strips 4 does not take too much force, whereas once the protrusion 11 rests inside said groove 14 dismounting the connecting piece 6 from the strips 4 cannot take place easily. The stop 13 facing towards the free end of the connecting piece 6 also ensures that the strips are kept at a mutual constant distance, as the upper end of each strip 4 is located between said stop 13 and a (side) wall of the connecting piece 6.

The present invention is not limited to the embodiment shown, but extends also to other embodiments falling within the scope of the appended claims.

We claim:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein at least one connecting piece comprises engaging members engaging around the longitudinal strips so that said strips are mounted in grooves formed by said engaging members, wherein said strips and said connecting piece are slidably connected by means of a snap connection, wherein the snap connection comprises laterally extending means onto said strips, and wherein said laterally extending means comprises at least one protrusion extending laterally from a longitudinal edge of each strip with each of said protrusions being located between and in engagement with stops on said connecting piece.

2. A windscreen wiper device according to claim 1, wherein said laterally extending means comprise at least two stops extending laterally from a longitudinal edge of each strip, said stops being located on opposite sides of a protrusion on the connecting piece.

3. A windscreen wiper device according claim 1, wherein said laterally extending means extend laterally from an interior longitudinal edge of each strip.

4. A windscreen wiper device according to claim 1, wherein said laterally extending means extend laterally from an exterior longitudinal edge of each strip.

5. A windscreen wiper device according to claim 1, wherein the engaging members are integral with said connecting piece.

6. A windscreen wiper device according to claim 1, wherein said connecting piece is provided with an opening at its free end so that the wiper blade can freely slide through said connecting piece.

7. A windscreen wiper device according to claim 1, wherein a spoiler is provided and wherein an end of said spoiler is mounted in said connecting piece.

8. Method for manufacturing a windscreen wiper device according to claim 1, wherein opposing longitudinal grooves are formed in the longitudinal sides of an elongate wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein a connecting device is provided for an oscillating wiper arm, wherein said strips and at least one connecting piece are slidably connected by means of a snap connection, wherein engaging members of said connecting piece engage around the longitudinal strips so that said strips are mounted in grooves formed by said engaging members, wherein the snap connection comprises laterally extending means onto said strips, and wherein said laterally extending means comprises at least one protrusion extending laterally from a longitudinal edge of each strip with each of said protrusions being located between and in engagement with stops on said connecting piece.

* * * * *